May 31, 1949.　　　　　P. J. WILSON　　　　　2,471,917
TRUCK BODY COMPRISING REMOVABLE PANELS
Filed Aug. 7, 1946　　　　　　　　　　　　7 Sheets-Sheet 1

Inventor:
Perry J. Wilson.
By Brown, Jackson, Boettcher & Dienner.
Attys.

May 31, 1949.　　　　P. J. WILSON　　　　2,471,917
TRUCK BODY COMPRISING REMOVABLE PANELS
Filed Aug. 7, 1946　　　　　　　　　　　　　　　7 Sheets-Sheet 3

Inventor:
Perry J. Wilson.
By Brown, Jackson, Boettcher & Dienner,
Attys.

May 31, 1949.　　　　P. J. WILSON　　　　2,471,917
TRUCK BODY COMPRISING REMOVABLE PANELS
Filed Aug. 7, 1946　　　　　　　　　　　7 Sheets-Sheet 4

May 31, 1949.  P. J. WILSON  2,471,917
TRUCK BODY COMPRISING REMOVABLE PANELS
Filed Aug. 7, 1946  7 Sheets-Sheet 6

Patented May 31, 1949

2,471,917

UNITED STATES PATENT OFFICE 2,471,917

TRUCK BODY COMPRISING REMOVABLE PANELS

Perry J. Wilson, New Paltz, N. Y., assignor to Electric Boat Company, Groton, Conn., a corporation of New Jersey Application August 7, 1946, Serial No. 689,052

5 Claims. (Cl. 296—28)

1

This invention relates to trucks and analogous conveyances, and has to do more particularly with the construction of truck bodies and similar structures.

As is known, goods and merchandise of various sorts are transported in great quantity by automobile trucks. The bodies of commercial trucks are subjected to severe stresses in use and, in many cases, are of large size. They must be of adequate mechanical strength to withstand the stresses encountered, and all the parts must be tightly secured together, to avoid pulling apart or objectionable looseness of play thereof. Due to the conditions of use and the requirements stated, truck bodies as presently constructed are excessively heavy and repair thereof, in case of serious injury thereto, is often expensive and time consuming requiring that the truck remain out of service for a considerable length of time with resultant serious loss to the truck owner or operator.

My invention is directed to a truck body construction, or analogous structure, which avoids the above noted objections to truck bodies as presently constructed. The truck body of my instant invention is of comparatively light weight, possesses adequate mechanical strength, may be constructed at substantially less cost than comparable truck bodies as heretofore constructed, and may be repaired with but little delay and at comparatively small cost in the event of substantial injury thereto. More specifically, the truck body of my invention comprises frame members of comparatively light weight but considerable mechanical strength and cooperating wall and roof members so secured to the frame members as to be readily removable and replaceable. The walls and the roof of the truck body comprise, in major portion at least, interchangeable panels extending between and removably secured to the frame members so as to be readily removable and replaceable as separate units, whereby in the event of injury to the truck body the panel or panels included in the damaged area may be removed and replaced by new panels so that the necessary repair may be effected with a minimum of delay. An important feature of my invention resides in the provision of frame members such that the wall and roof panels and associated parts may be secured to the frame members with facility and expedition while eliminating all possibility of objectionable looseness or play between the parts of the body. Further objects and advantages of my invention will appear from the detail description.

2

Figure 1:
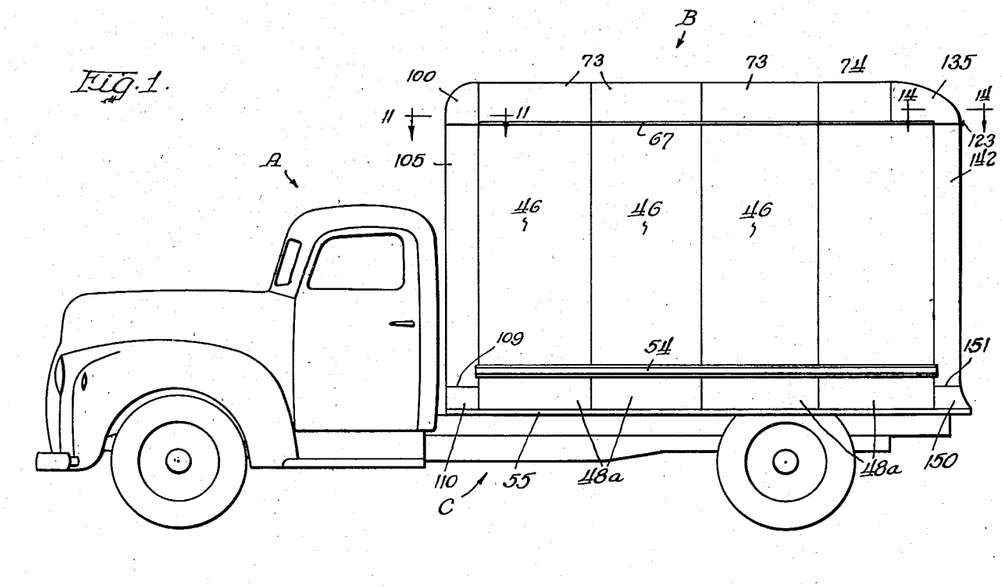
Figure 1 is a side view of an automobile truck having a body constructed in accordance with my invention.

I have illustrated the truck body of my invention, by way of example, as embodied in an automobile truck A comprising a wheel mounted chassis C upon which the body B is mounted in a suitable known manner. The body structure of my invention is, in its broader aspects, applicable to various kinds of vehicles or conveyances, but is particularly suitable for automobile truck bodies, as will appear more fully herein.

Figures 7, 8:
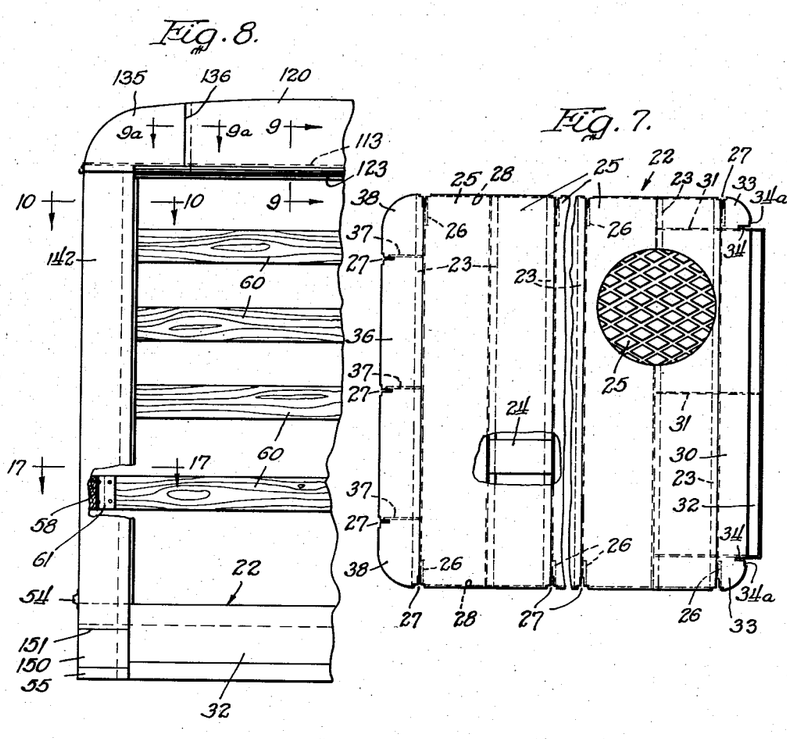
Figure 7 is a plan view, partly broken away, of the floor structure of the truck body.
Figure 8 is a fragmentary rear view of the truck body.

The truck body construction of my invention comprises a floor structure 22 (Figure 7) having suitably spaced cross members 23 of angle cross section connected together by suitably disposed spacing and bracing member 24 constituting, with members 23, a frame for the flooring. Steel floor plates 25, of a width equal to the distance between three cross members 23 and of a length equal to the width of the floor structure, rest upon the cross members 23, the floor plates 25 being welded together and to the cross members upon which they rest at their edges. Brackets 26 are welded or otherwise suitably secured to the ends of the cross members 23 to which the floor plates 25 are secured, these brackets being disposed adjacent T-shaped notches 27 provided in the floor plates along the sides of the floor structure and, as will appear more fully later, along the front thereof. Side flanges 28 extend between the notches 27 and are welded to the under face of the floor plates, depending therefrom and together providing lengthwise flanges at the sides of the floor structure. A floor plate 30, of substantially less width than the plates 25, is welded edge to edge to the rearmost of the latter plates and to the corresponding cross member 23. Brackets 31 are welded or otherwise suitably secured to, and extend rearward from, the two rearward cross members 23, these brackets assisting in supporting plate 30, welded at its end to the brackets 31, and also providing structural elements of, and supporting, a foot rail or step structure 32 extending rearward a short distance beyond the floor structure proper. The ends of plate 30 are rounded at 33, as shown, and provided with rearwardly opening slots 34 and notches 34ª for reception of frame members, as will appear more fully later. A floor plate 36, of substantially less width than the floor plates 25, is mounted on and welded or otherwise suitably secured to brackets 37 welded to and extending forward from the front cross member 23. The ends of plate 36 are rounded at 38, as shown, and this plate is provided, in its forward edge, with suitably spaced T notches 27. The floor plates 25, 30 and 36 are steel plates known commercially as "Diamondette" plates, provided on their upper faces with diamond shaped embossments or projections, to reduce risk of slippage.

Each of the notches 27 of the floor structure receives an upright 40 (Figures 3 and 4) of T cross section, comprising a stem 41 extending inward of the floor structure and a head at the outer end of the stem providing flanges 42 projecting a substantial distance beyond the sides of stem 41 perpendicular thereto, the outer faces of flanges 42 being flat to provide seating surfaces of substantial area for panel members, as will be explained more fully presently. Upright 40 is further provided with a projection 43 extending outward beyond flanges 42 as a continuation of stem 41, the latter being provided with a slot 44 terminating a substantial distance from its inner end and opening through projection 43 separating the latter into two ribs extending lengthwise of upright 40 at opposite sides of slot 44.

Figure 4:
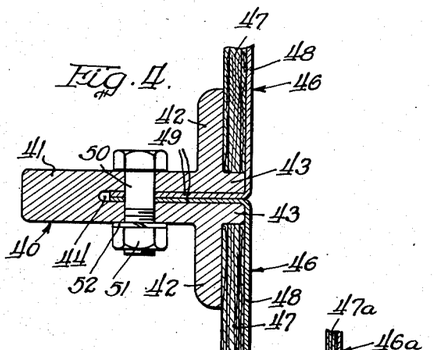
Figure 4 is a sectional view, on an enlarged scale, taken substantially on line 4—4 of Figure 3, certain parts being shown in plan.

The uprights 40 are equally spaced, extend downward below the floor plates and are bolted to the brackets 26. Panels 46 extend between uprights 40, to which they are removably secured with their side portions seating on flanges 42, these panels defining the side and front walls of the body structure. As noted, the uprights 40 are equally spaced, and the panels 46 are of uniform width and length, being readily interchangeable. Preferably, each of the panels 46 comprises a body or filler 47 of laminated structure, conveniently formed of plywood, bonded to an outer sheet metal facing sheet 48 formed of aluminum or other like metal or metal alloy. The facing sheet 48 extends beyond the sides of filler 47 a distance equal to the width of the respective ribs 43, and is provided, at its outer edge, with an integral flange 49 disposed perpendicular to the plane of sheet 48. The panels 46 extend between the uprights 40 with their side portions seating on flanges 42 thereof, the side edges of adjacent panels abutting the ribs 43 of the upright, with flanges 49 of sheet 48 extending into slot 44 of the upright, as shown in Figure 4. It will be noted that the width of slot 44 is such that the flanges 49 of two adjacent panels may be inserted into slot 44, with a snug fit therein. The flanges 49 are provided with registering openings which receive securing bolts 50 inserted through stem 41 of upright 40 and passing through flanges 49, as noted. Bolt 50 receives a nut 51, between which and stem 41 of upright 40 is disposed a lock washer 52 of known type. The uprights 40 are formed, conveniently by extrusion, of magnesium or other suitable like metal or alloy possessing adequate mechanical strength. It will be seen that the bolts 50 provide positive anchorage for flanges 49 in the uprights, and by turning the nuts 51 tightly on to the bolts, the slotted portion of the respective uprights 40 may be contracted slightly so as to clamp firmly the flanges 49 of panels 46, effectively securing them to the uprights and guarding against any undesirable looseness or play between parts. It will be seen that the panels 46 may readily be removed and replaced, as conditions may require, and these panels, in addition to defining the walls of the truck body, function as bracing members effective for preventing undesirable fore and aft movement of the uprights with resultant weaving of the walls of the body.

Figure 3:
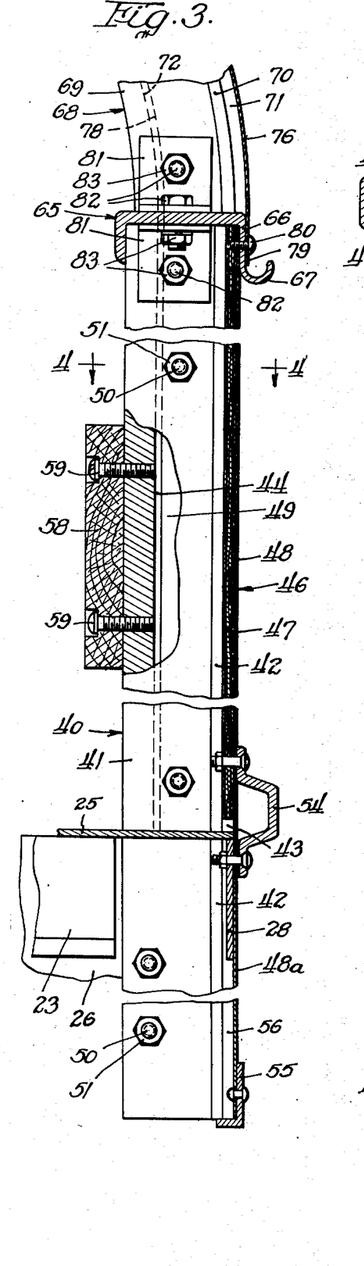
Figure 3 is a fragmentary sectional view, partly broken away, on an enlarged scale, taken substantially on line 3—3 of Figure 2, certain parts being shown in elevation.

Referring further to Figure 3, it will be noted that the filler 47 of the respective panels 46 terminates a short distance above the floor plates 25. The finishing sheet 48 extends downward a short distance below floor plates 25. Skirt sheets 48ª, of the same width as panels 46, extend downward from sheets 48 to the lower ends of uprights 40. The upper portion of the respective skirt sheets 48ᵃ is offset outwardly and disposed in overlapping relation to the lower portion of the corresponding panel facing sheet 48. A flanged rub rail 54, of channel cross section, extends along each side of the truck body and has its upper flange bolted to panels 46 and its lower flange bolted to side flanges 28 of the floor structure. The lower flange of rail 54 cooperates with the associated bolts and flanges 28 for securing the sheets 48 and 48ᵃ together and to floor flange 28. The skirt sheets 48ᵃ are formed of aluminum and are provided at their sides with securing flanges, corresponding to flanges 49 of panels 46, extending into and secured in uprights 40 in the same manner as the latter flanges. An angle guard strip 55 extends about and protects the lower portions of skirt sheets 48ᵃ, to which it is riveted or otherwise suitably secured. Spacing strips 56 of wood, bonded or otherwise suitably secured to the skirt sheets 48ᵃ, seat against the outer faces of head flanges 42 of the respective uprights 40. The rub rails 54 and the guard strips 55, like the uprights 40, are formed, conveniently by extrusion, of magnesium alloy or other suitable light weight metal or alloy of adequate mechanical strength, such as aluminum or aluminum alloy.

As previously noted, the rub rails 54 extend along the sides of the truck body, as do the guard strips 55. The front wall of the truck body is, in general, constructed similarly to the side walls subject to variations in detail as conditions may require, particularly with respect to mounting of the truck body on the automobile chassis. Such details are not of the essence of my invention and need not be illustrated nor described here, it sufficing to note that variations may be resorted to as required. Interiorly of the truck body, the uprights 40 at the sides of the body frame are connected by a suitable number of wooden battens 58 suitably secured thereto, conveniently by means of self tapping screws 59, and the uprights 40 at the front of the body are similarly connected by wooden battens 60, the adjacent ends of the battens, at the front corners of the body, being connected by steel corner brackets 61 secured thereto by screws or in any other suitable manner. The battens 58 and 60 tie together the uprights at the sides and the front of the truck body and supplement the panels in restraining the uprights against objectionable swaying with resultant weaving of the body, while also guarding the panels against injury by crates or other articles of substantial size being transported in the truck body. It will be noted that the length of the unslotted inner portion of stem 41 of the respective uprights 40 is much greater than the width of slot 44, being approximately one third of the distance from the inner end of stem 41 to the outer face of the head of upright 40. That provides reinforcement for the upright 40 as well as adequate anchorage for the screws 59, while avoiding risk of interference by screws 59 with insertion of the flanges 49 of the panels 46 into slot 44.

Figure 2:
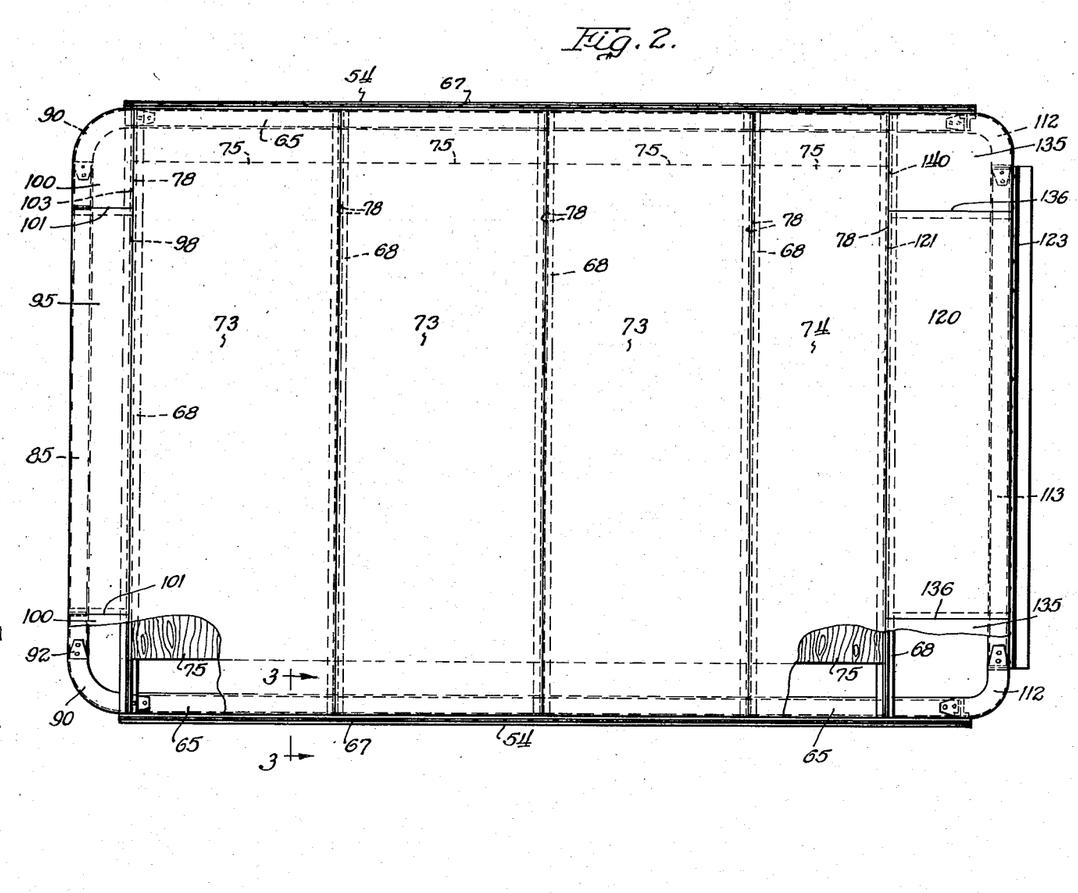
Figure 2 is a plan view, on an enlarged scale, of the truck body of Figure 1, with the metal skin of the roof broken away at certain areas thereof.

The uprights 40 are of uniform height and those at each side of the truck body are connected, at their upper ends, by a sill 65 of channel cross section (Figures 2 and 3) fitting thereover. The outer flange 66 of sill 65 extends downward an appreciable distance over the upper end portions of the panels 46, in close contact therewith, and is formed at its lower portion to provide an upwardly directed drip trough 67. The sills 65 are formed, conveniently by extrusion, of magnesium alloy or other light weight metal or alloy of adequate mechanical strength. Roof bows 68, of the same cross section as uprights 40 and, like the latter, formed of magnesium alloy, extend between the side sills 65 with their ends seating thereon in substantial alignment with the upper ends of the respective pairs of uprights 40 which, as will be understood and will be clear from Figure 2, are arranged in pairs with those of each pair aligned transversely of the truck body, it being noted however that the rearmost roof bow is disposed somewhat forward of the rearmost pair of uprights 40, for a purpose which will appear presently.

The roof bows 68 are curved lengthwise conformably to the desired transverse contour of the roof and are of substantially T-shape in cross section, comprising a stem 69 directed inwardly or downwardly of the truck body, head flanges 70 at the outer or upper end of the stem, and ribs 71 extending lengthwise of the bow 68 at opposite sides of a slot 72 opening through the head of the bow and terminating a substantial distance from the inner end of the stem thereof. The roof bows 68 receive between them roof panels 73 and 74, the panels 73 being of uniform width and the panels 74, extending between the rearmost roof bow and the next adjacent bow, being of substantially less width than the panels 73. Each of the roof panels is constructed similarly to the wall panels and comprises an inner body or filler 75 of plywood or like laminated material, and an outer finishing sheet 76 of aluminum. The side edges of filler 75 are spaced inward from the sides of finishing sheet 76 a distance equal to the width of the respective ribs 71 of roof bow 68, and finishing sheet 76 of each roof panel is provided, at each side thereof, with a flange 78 which extends into the slot 69 of a roof bow, in which the flanges 78 are secured in the same manner as the flanges of the wall panels are secured in the uprights 40. Conveniently, the filler 75 of the respective roof panels 76 terminates a substantial distance inward of the ends of finishing sheet 76, the end portion of which, at each side of the body, is curved downward about ribs 71 in seating contact therewith. The width of the roof bows 68, at their lower ends, taken from side to side of the truck body, is such that the outer faces of ribs 71 thereof are flush with the outer faces of the outer flanges 66 of the sills 65, as will be clear from Figure 3. The flange 78 of finishing sheet 76 of each roof panel terminates at the upper face of sill 65, and sheet 76 is provided with an end extension 79 overlapping flange 66 and extending downward therealong substantially to the drip trough 67, extension 79 being secured to flange 66 and to the side panels 46 by screws 80 or other suitable means permitting ready detachment of the parts. The uprights 40, sills 65 and roof bows 68 are secured together, at each side of the body, by angle brackets 81, disposed above and below sill 65 in seating contact therewith and at opposite sides of the stems of uprights 40 and roof bows 68, these parts being secured together by bolts 82 passing therethrough and nuts 83 threaded on the bolts. Certain of the bolts 82 pass through the side flanges of the body panels and the roof panels, securing the flanges of the panels in the uprights and in the roof bows, in the manner previously described. Since the rearmost roof bow is offset forwardly from the rearmost uprights 40, as above noted, that bow and those uprights are separately secured to the side sill 65 by means of angle brackets bolted thereto in the manner above described.

Figures 11, 12, 13:
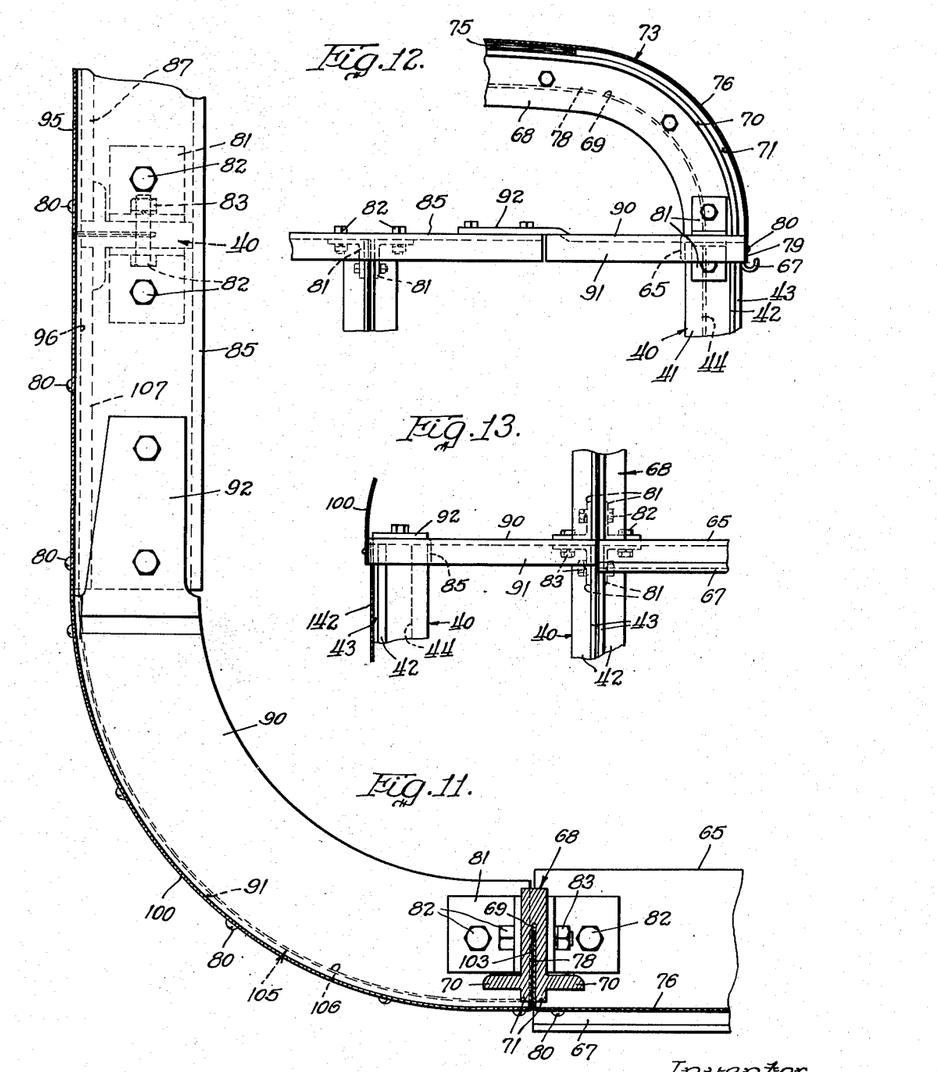
Figure 11 is a fragmentary sectional view, on an enlarged scale, taken substantially on line 11—11 of Figure 1, showing the construction of one upper front corner portion of the body frame.
Figure 12 is a front view, on a reduced scale, of the corner construction of Figure 11, with the metal skin of the side portion of the roof shown in section.
Figure 13 is a side view of the corner frame structure of Figure 12, with the metal skin of the roof and the metal skin of the front wall of the body shown in section.

A front sill 85, of channel cross section and formed of magnesium alloy, or other light weight metal or alloy, fits over the upper ends of the front uprights 40 to which it is secured by angle brackets 81 and associated bolts and nuts 82 and 83. Front panels 87, constructed similarly to the side panels 46, extend between the front uprights 40, upon the head flanges of which they seat and to which they are removably secured in the same manner as the side panels seat upon and are removably secured to their associated uprights 40. The front panels are of the same width as the side panels, as previously noted, and may be interchangeable therewith. The truck body may be provided at the front thereof with depending skirt panels connected to the lower end portions of the front wall panels by interlocking joints of known type permitting detachment of the skirt panels from the front wall panels, these skirt panels being removably secured to the front uprights and having secured to their lower edges an angle guard strip, in the same manner as the side skirt panels. The forward end of each side sill 65 is connected to the adjacent end of the front sill 85 by an arcuate corner frame member 90 provided at its forward edge with a depending flange 91. This corner member 90 is formed of magnesium alloy, or other suitable light weight metal or alloy, and is provided at its forward end with an upwardly offset tongue 92 which seats upon and is bolted to sill 85. At its rearward end member 90 is secured to the front or first side upright 40 by an angle bracket 81 and associated bolt, in the manner previously described. Flange 91 of member 90 is of the same thickness as the outer flange 66 of side sill 65, and the front flange of sill 85, providing an arcuate surface extending between these two flanges and merging smoothly therewith. A front roof sheet 95, formed of sheet aluminum and shaped conformably to the front portion of the roof of the truck body, extends downwardly over the outer or front flange 96 of front sill 85, to which it is removably secured by screws 80, in the same manner as the end extensions 79 of the roof panels are secured to flange 66 of the respective side sills 65. Sheet 95 is provided, at its rearward edge, with a flange 98 which extends into the slot in the front bow 68, together with flange 78 of the front roof panel 73, the flanges 78 and 98 being secured in bow 68 in the manner previously described. A front roof corner member 100, formed of aluminum and shaped conformably to the front corner of the roof, is attached to each end sheet 95 by an interlocking joint 101 of known type, providing a water tight and readily detachable connection therebetween. Each of the roof corner members 100 extends downward over the outer flange 96 of front sill 85 and flange 91 of the associated corner frame member 90, to which flanges 96 and 91 it is removably secured by screws 80. Each of the roof corner members 100 is further provided, at its rearward edge, with a flange 103 which, as is shown more clearly in Figure 11, extends into the slot of the front roof bow 68, together with the flange 78 of the front roof panel 63, in which the flanges 103 and 78 are secured in the manner previously described. A front corner panel 105 connects the forward end of each side wall of the body to the corresponding side of the front wall of the body. Panel 105 comprises an outer facing sheet 106 of aluminum curved transversely conformably to the corner frame member 90 and the corresponding forward corner of the floor. The curved portion of sheet 106 fits snugly about the corner of the floor and, at its upper end, within flange 91 of the corner frame member 90. The finished sheet 106 of panel 105 is straight at its inner portion, for a substantial extent of its total width, and is there provided with a plywood filler 107, this straight inner portion of the panel 105 seating, at its inner edge portion, on a head flange of an outer one of the front uprights 40 and extending upward within sill 85, and the inner face of flange 96 thereof. Sheet 106 of panel 105 is provided, at each side thereof, with a flange directed inwardly of the body of the truck, these flanges engaging into the slots of the adjacent uprights 40 and being removably secured therein in the manner previously described. The corner panels 105 extend downward a substantial distance below the floor plate 25 and have attached to their lower ends, by lock joints 109 of known type, skirt panels 110, the lock joint 109 permitting ready detachment of the corner panel 105 from its associated skirt panel 110. The angle guard strip, previously referred to, secured to the lower edges of the skirt panels associated with the front wall panels, is extended about and secured to the lower edges of the skirt panel 110.

Figure 9:
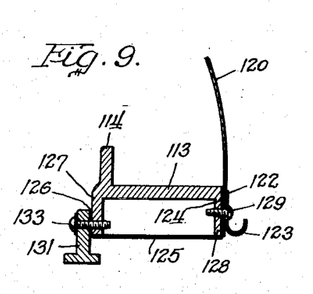
Figure 9 is a sectional view, on an enlarged scale, taken substantially on line 9—9 of Figure 8, certain parts being shown in elevation.
Figures 14, 15, 16, 17:
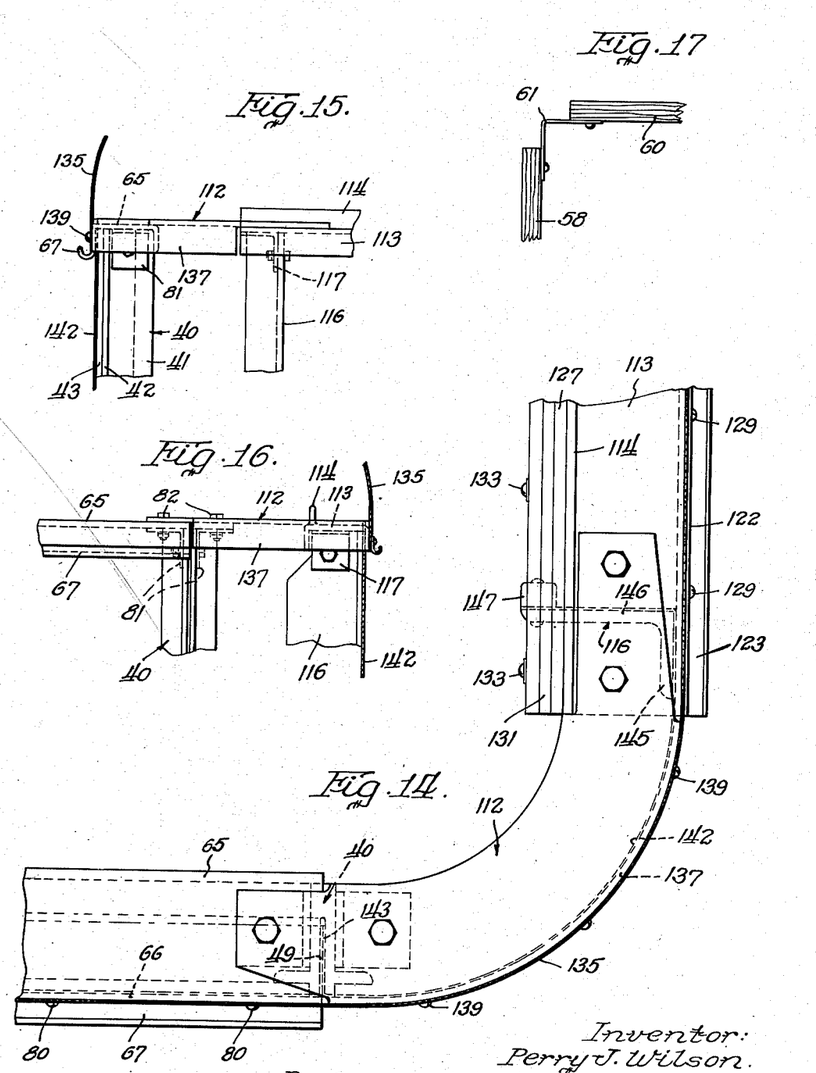
Figure 14 is a fragmentary sectional view, on an enlarged scale, taken substantially on line 14—14 of Figure 1, showing the construction of one upper rear corner portion of the body frame.
Figure 15 is a rear view, on a reduced scale, of the corner construction of Figure 14, with the metal skin of the roof and of the side wall shown in section.
Figure 16 is a side view of the corner frame structure of Figure 15, with the metal skin of the roof and of the back wall shown in section.
Figure 17 is a fragmentary plan view, on an enlarged scale, of the adjacent end portions of a front wall batten and a side wall batten and the bracket connecting them, taken substantially on line 17—17 of Figure 8.
Figure 18:
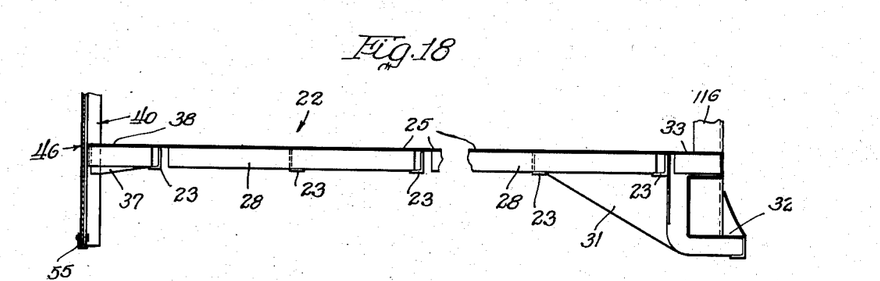
Figure 18 is a side view, partly broken away of the floor structure of the truck body.

Referring to Figures 14 to 16, inclusive, the rearmost upright 40 at each side of the truck body has secured thereto an arcuate rear corner frame member 112 the forward end portion of which also overlies and is secured to side sill 65. The rearward end portion of corner frame member 112 overlies and is bolted to an upper door frame member 113 of channel cross section (Figure 9) having at its inner side an upwardly extending reinforcing flange 114. Member 113 receives, adjacent each end thereof, the reduced upper end of a side door frame member 116 of angle cross section, secured to member 113 by an angle bracket 117 bolted thereto and to member 116. The latter member 116 extends downward through slot 34 and notch 34ᵃ of the floor structure (Figure 7) alongside the bracket 31, to which it is secured, conveniently by bolting. The frame members 113 and 116 are formed of magnesium alloy, or other suitable light weight alloy or metal of adequate mechanical strength, and define a door opening which, if desired, may have associated therewith a suitably mounted door or doors.

Figure 9A:
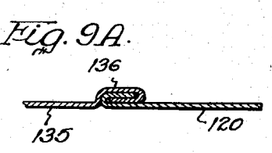
Figure 9A is a sectional view, on an enlarged scale, taken substantially on line 9a—9a of Figure 8.

A back roof sheet 120 (Figures 2, 8 and 9), formed of sheet aluminum and shaped conformably to the back of the roof, extends between the rearmost roof bow 68 and the door sill or frame member 113. Sheet 120 is provided, at its forward edge, with a flange 121 which extends, together with flange 78 of roof panel 74, into the slot of bow 68, in which the flanges are secured in the manner previously described. Sheet 120 extends downward and rearward between flange 122 of a drip trough 123 and flange 124 of a sheet aluminum covering 125 extending across member 113 and provided at its forward edge with an upwardly extending flange 126 disposed at the inner face of inner flange 127 of member 113. Flange 124 of sheet 125 seats against the outer face of outer flange 128 of member 113, to which it is secured by self tapping screws 129 passing through flange 122 of trough 123 and through the lower portion of roof sheet 120 and threading into flange 128, serving to secure all of these parts together. The inner flange 126 of sheet 125 is secured to flange 127 of member 113 by a door jamb strip 131, also formed of magnesium alloy, seating on flange 126 and secured to flange 127 by self tapping screws 133. Roof corner members 135, formed of aluminum and shaped conformably to the rearward corners of the roof, are detachably connected, by interlocking joints 136 (Figure 9A) of known type, to the ends of the rear roof sheet 120. The corner members 135 extend downward in overlapping relation to the depending flanges 137 of corner members 112 and, for a portion of their length, in overlapping relation to flange 128 of door frame member 113, to which flange 128 they are secured by certain of the screws 129. The corner members 135 are also secured to flanges 137 by self tapping screws 139. At their forward edges the corner members 135 are provided with flanges 140 which extend into the slot in the adjacent roof bow 68 and are secured therein in the manner previously described. Since, as previously noted, the rearmost roof bow 68 is offset forwardly from the rearmost side uprights 40, the rear roof corner members 135 extend forward a short distance along flanges 66 of the side sills 65, to which they are secured by the screws 80, as will readily be understood from Figures 3 and 14.

Figure 10:
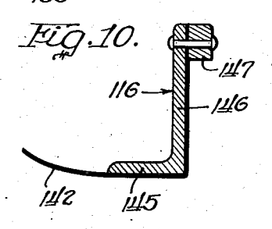
Figure 10 is a sectional view, on an enlarged scale, taken substantially on line 10—10 of Figure 8, certain parts being shown in elevation.

A corner panel 142 (Figures 1, 8 and 10) extends downward from each of the rear roof corner members 135. The panel 142 is formed of sheet aluminum, is curved transversely conformably to the curvature of the corner frame member 112 and the corresponding corner of the floor, and extends from the door frame member 116 to the rearmost upright 40 at the adjacent side of the truck body. The upper end portion of corner panel 142 fits snugly within the depending flange 137 of corner member 112, and this panel extends downward a substantial distance below the floor structure. At its forward edge panel 142 is provided with a flange 143 which, together with the flange at the rearward side of the last or rearmost side panel 46, extends into the slot of the rearmost upright 40, in which the flanges are removably secured in the manner previously described. The rearward portion of each corner panel 142 extends across the outer face of rear flange 145 (Figure 10) of the corresponding door frame member 116, and thence along the outer face of flange 146 of member 16, to which this panel is secured by a door jamb strip 147 formed, like a strip 131, of magnesium alloy and riveted to flange 146, strip 147 being aligned with and extending downward from strip 131. A suitably formed skirt panel 150 (Figures 1 and 8) is detachably secured by an interlocking joint 151 of known type, to the lower end of corner panel 142, the lower edge of skirt panel 150 having secured thereto a protecting strip of angle cross section, which may be a continuation of strip 55 previously referred to. The interlocking joint 151 may be similar to the joint 136 of Figures 8 and 9A, which may be taken as illustrative of the other interlocking joints previously referred to.

Figure 5:
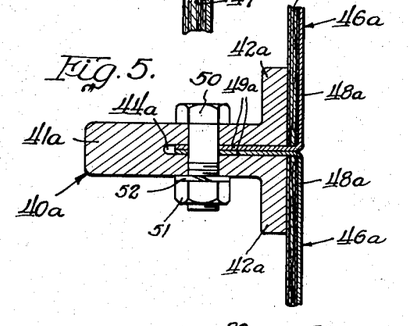
Figure 5 is a view like Figure 4 but showing a modification.
Figure 6:
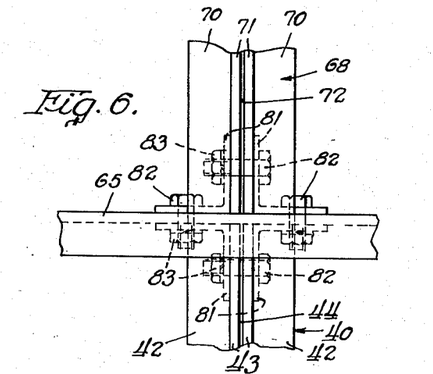
Figure 6 is a side view, on an enlarged scale, of the body frame structure, showing the connections between an upright and a roof bow and associated parts.

In Figure 5 I have shown a modified form of panel 46ª suitable for use either as a wall panel or a roof panel. The panel 46ª comprises an outer finishing sheet 48ª of aluminum, to which is bonded a laminated body or filler 47ª of what is known commercially as "Tekwood," comprising a central sheet of maple wood to the opposite faces of which are bonded thin sheets of cardboard, the total thickness of filler 47ª being approximately $\frac{7}{16}$ of an inch as compared to a thickness of approximately $\frac{1}{8}$ of an inch of the plywood filler 47 of Figure 4. When using the panels 46ª, frame members—uprights and roof bows—of substantially T cross section similar to member 40ª of Figure 5 may be used. The member 40ª comprises an inwardly directed stem 41ª provided at its outer end with head flanges 42ª and having a slot 44ª opening through its outer or head end. Flanges 49ª, at the adjacent sides of panels 46ª, extend into slot 44ª and are removably secured therein in the manner previously described. It will be noted that in Figure 5 the panels 46ª are disposed in sidewise abutment with their side portions seating on the outer faces of flanges 42ª, the ribs 43 of the frame member shown in Figure 4 being omitted. With the exceptions noted, the body structure when using panels 46ª may be otherwise the same as when using panels 46.

Figure 19:
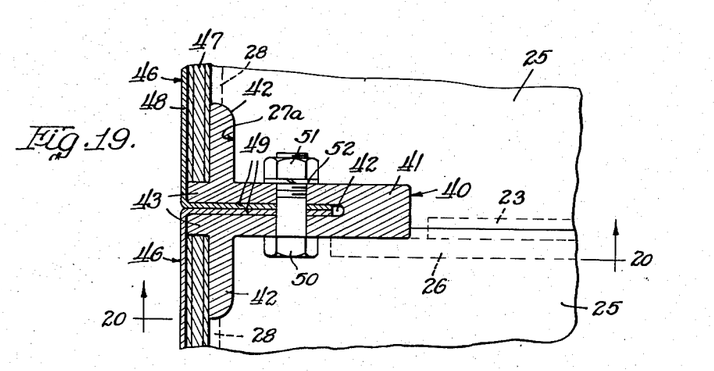
Figure 19 is a sectional view, on an enlarged scale, taken substantially on line 19—19 of Figure 20, showing a modification.
Figure 20:
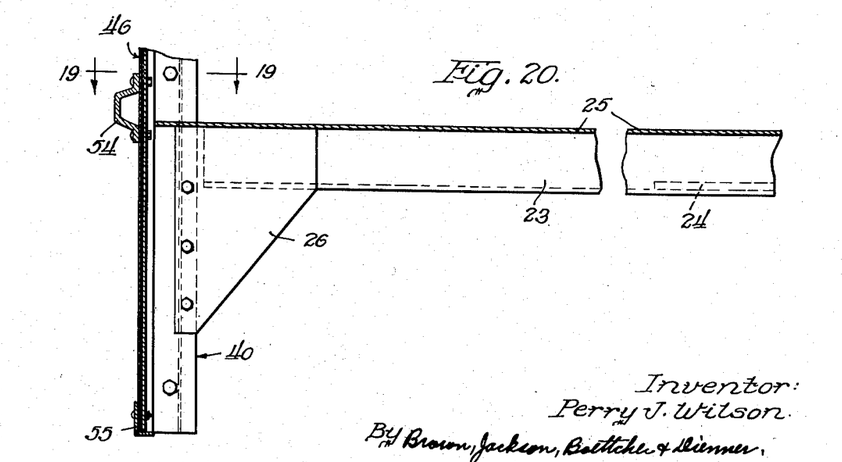
Figure 20 is a sectional view, on a reduced scale, taken substantially on line 20—20 of Figure 19.

In the truck body so far described, the front and side edges of the floor formed of the plates 25, 30 and 36, are substantially flush with the inner faces of the outer aluminum finishing sheets of the side and front body panels, as in Figure 3, and the bodies or fillers of those panels terminate at or a short distance above the floor plates. If desired, however, the floor plates may be provided with notches 27ª of such depth and extent that the side and front edges of the floor are substantially flush with the outer faces of the head flanges 42 of uprights 40, or the head flanges 42ª of uprights 40ª, as the case may be. In Figure 19, I have shown the side edge of the floor as flush with the outer faces of head flanges 42 of upright 40. When that construction is used, the wall panels may be of full length so as to extend downward beyond the floor to the protecting or guard strip 55, and the filler 47 may extend uninterruptedly from the top to the bottom of the panel 46, as will be clear from Figures 19 and 20. That avoids the use of skirt panels such as those previously referred to and is conducive to simplified construction. When continuous wall panels of the type just referred to are used, the rub rails 40 may be omitted, if desired, and the protecting angle strip 55 is removably secured to the lower ends of the panels by bolt and nut means, or in any other suitable manner.

It will be seen that in the truck body construction of my invention the various parts thereof are mutually supporting and reinforcing and are tightly tied together so as to eliminate objectionable looseness or play of parts, resulting in a body of comparatively simple construction the various elements of which may readily be removed and replaced as required. The walls and the roof of the truck body, in major portion, are formed of interchangeable panels which may be quickly and easily removed and replaced as required. When using wall panels having skirt panels attached to their lower ends, any selected wall panel may readily be removed by first removing the rub rail 54, the screws 80 securing the upper end portion of that panel to the sill 65, and the bolts 50 securing the side flanges of the panel to the uprights 40 at the sides thereof, after which the panel may be tilted outward slightly at its lower end and then slid downward from beneath flange 66, and then completely withdrawn from the uprights. By reversing the operation, a panel may be as quickly and easily inserted in the wall structure in replacement of a removed panel. That renders possible quick repair of the truck body in the event of substantial damage thereto. Likewise, all other elements of the truck body are readily removed and replaced. The roof panels may also be removed and replaced with expedition and facility, in an obvious manner. The use of the slotted uprights and roof bows of substantially T cross section are of particular advantage in providing frame members of adequate mechanical strength, which members also serve as means for mounting the panels and other elements forming the walls of the body and tightly securing such elements in position in a manner effectively guarding against objectionable looseness or play thereof, while permitting ready removal and replacement of the various elements of the body as conditions may require.

As above indicated, and as will be understood by those skilled in this art, changes in construction and arrangement of details of my invention may be resorted to without departing from the field and scope thereof, and I intend to include all such variations, as fall within the scope of the appended claims, in this application in which the preferred forms only of my invention have been disclosed.

I claim:

1. In a truck body construction, a floor structure, uprights of substantially T cross section secured to said structure extending upward therefrom respectively comprising a stem having a head at one end and an element projecting beyond said head oppositely to said stem as a continuation of the latter, said uprights respectively having therein a lengthwise slot opening through said element providing at each side of said slot a rib extending lengthwise of and projecting beyond said head, and panels extending between said uprights seating at their side portions on said heads with their sides in close proximity to said ribs, said panels having lateral projections extending across said ribs provided with flanges extending into and removably secured in said slots.

2. In a truck body construction, a floor structure, uprights of substantially T cross section secured to said structure extending upward therefrom respectively comprising a stem having a head at one end and an element projecting beyond said head oppositely to said stem as a continuation of the latter, said uprights respectively having therein a lengthwise slot opening through said element providing at each side of said slot a rib extending lengthwise of and projecting beyond said head, and panels extending between said uprights respectively comprising a filler of substantially the same thickness as the height of said ribs and a finishing sheet secured to said filler projecting beyond the sides thereof a distance substantially the same as the width of said ribs and provided at its side edges with flanges substantially perpendicular to said sheet, the side portions of said fillers seating on the heads of said uprights with their edges abutting said ribs and the side portions of said sheet extending across said ribs with said flanges inserted into said slots, and means removably securing said flanges in said uprights.

3. In a truck body construction, a floor structure, a body frame structure mounted on said floor structure comprising frame members of substantially T cross section disposed with their stems extending inward of said frame structure, said frame members respectively comprising a stem having a head at its outer end and an element projecting outward beyond said head as a continuation of said stem, said frame members respectively having therein a lengthwise slot opening through said element providing at each side of said slot a rib extending lengthwise of said head, and panels extending between said frame members seating at their edge portions on said heads with their edges substantially abutting said ribs, said panels having lateral projections extending across said ribs provided with flanges extending into and removably secured in said slots.

4. In a truck body construction, a floor structure, uprights of substantially T cross section secured to said structure extending upward therefrom and disposed with their heads outward thereof, said uprights having therein lengthwise slots opening through their heads, the slot of the respective uprights extending into the stem thereof and having its inner end spaced outward from the inner end of said stem a distance materially greater than the width of said slot, juxtaposed body panels extending between said uprights seating at their side portions on the heads thereof and having side flanges removably secured in said slots of said uprights, and battens extending across the inner ends of the stems of said uprights and secured thereto tying said uprights together.

5. In a truck body construction, a floor structure, uprights of substantially T cross section secured to said structure extending upward therefrom and disposed with their heads outward thereof, said uprights having therein lengthwise slots opening through their heads, the slot of the respective uprights extending into the stem thereof and having its inner end spaced outward from the inner end of said stem a distance approximating one third of the distance from the inner end of said stem to the outer face of the head of the upright, juxtaposed body panels extending between said uprights seating at their side portions on the heads thereof and having side flanges removably secured in said slots of said uprights, and battens extending across the inner ends of the stems of said uprights secured thereto by screws threading into the inner ends of said stems, said battens tying said uprights together.

PERRY J. WILSON.

REFERENCES CITED

The following references are of record in the file of this patent:

UNITED STATES PATENTS

| Number | Name | Date |
| --- | --- | --- |
| 452,274 | Keller | May 12, 1891 |
| 1,506,442 | O'Hara | Aug. 26, 1924 |
| 1,674,394 | Hansen | June 19, 1928 |
| 1,894,356 | Lewis | Jan. 17, 1933 |
| 2,029,756 | Davis, Jr. | Feb. 4, 1936 |
| 2,085,338 | Schlesinger | June 29, 1937 |
| 2,100,323 | Fitch | Nov. 30, 1937 |
| 2,260,353 | Van Allen | Oct. 28, 1941 |
| 2,263,510 | Lindsay | Nov. 18, 1941 |

FOREIGN PATENTS

| Number | Country | Date |
| --- | --- | --- |
| 307,860 | Great Britain | Mar. 15, 1929 |